(12) United States Patent
Feng et al.

(10) Patent No.: US 11,748,576 B2
(45) Date of Patent: Sep. 5, 2023

(54) INTERPRETATION OF DEEP NEURAL MODEL BASED DIALOGUE AGENTS

(71) Applicant: International Business Machines Corporation, Armonk, NY (US)

(72) Inventors: Song Feng, New York, NY (US); Hui Wan, White Plains, NY (US); Chulaka Gunasekara, New Hyde Park, NY (US); Jatin Ganhotra, White Plains, NY (US); Sachindra Joshi, Gurgaon (IN); Luis A. Lastras-Montano, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 179 days.

(21) Appl. No.: 17/154,640

(22) Filed: Jan. 21, 2021

(65) Prior Publication Data
US 2022/0229995 A1     Jul. 21, 2022

(51) Int. Cl.
*G06F 40/35* (2020.01)
*G06F 40/284* (2020.01)
*G06F 40/44* (2020.01)

(52) U.S. Cl.
CPC ............ *G06F 40/35* (2020.01); *G06F 40/284* (2020.01); *G06F 40/44* (2020.01)

(58) Field of Classification Search
CPC ......... G06F 40/35; G06F 40/284; G06F 40/44
See application file for complete search history.

(56) References Cited

U.S. PATENT DOCUMENTS

| | | | |
|---|---|---|---|
| 10,650,302 B2 | 5/2020 | Graves et al. | |
| 2015/0179168 A1 | 6/2015 | Hakkani-Tur et al. | |
| 2015/0340033 A1 | 11/2015 | Di Fabbrizio et al. | |
| 2017/0228368 A1* | 8/2017 | Carter | G06F 40/216 |
| 2018/0260472 A1* | 9/2018 | Kelsey | G09B 7/02 |
| 2020/0066255 A1 | 2/2020 | Madan et al. | |
| 2020/0073938 A1 | 3/2020 | Losalka et al. | |
| 2020/0090641 A1 | 3/2020 | Kim et al. | |
| 2020/0184155 A1* | 6/2020 | Galitsky | G06F 40/205 |
| 2021/0217408 A1* | 7/2021 | Hakkani-Tur | G06F 40/284 |
| 2022/0207239 A1* | 6/2022 | Mitsuda | G06F 16/632 |

OTHER PUBLICATIONS

Vinyals, O., Le, Q.: A neural conversational model. In: Proc. ICML Deep Learning Workshop (2015) (Year: 2015).*

(Continued)

*Primary Examiner* — Fariba Sirjani
(74) *Attorney, Agent, or Firm* — Amin, Turocy & Watson, LLP

(57) ABSTRACT

Techniques facilitating interpretation of deep neural model based dialogue agents are provided. In one example, a computer-implemented method comprises extracting, by a device operatively coupled to a processor, features from a dialogue model independently from the dialogue model, the features comprising input features provided to the dialogue model and output features produced via the dialogue model in response to the input features, resulting in extracted features; and analyzing, by the device, a dialogue context associated with the extracted features by identifying pairwise interactions between respective ones of the extracted features.

20 Claims, 14 Drawing Sheets

(56) References Cited

OTHER PUBLICATIONS

Larasati et al., "Comparing Neural Network and Ordinal Logistic Regression to Analyze Attitude Responses," Service Science, 2011, 9 pages.

Le et al., "Grace: Generating Concise and Informative Contrastive Sample to Explain Neural Network Model's Prediction," arXiv:1911.02042v3 [cs.LG], Jun. 21, 2020, 11 pages.

Shi et al., "Convolutional Neural Networks for Multi-topic Dialog State Tracking," Dialogues with social robots, 2017, 11 pages.

Lee et al., "Sequential Short-Text Classification with Recurrent and Convolutional Neural Networks," arXiv:1603.03827v1 [cs.CL], Mar. 12, 2016, 6 pages.

Mrksic et al., "Multi-domain Dialog State Tracking using Recurrent Neural Networks," arXiv:1506.07190v1 [cs.CL], Jun. 23, 2015, 6 pages.

Korpusik et al., "Convolutional neural networks for dialogue state tracking without pre-trained word vectors or semantic dictionaries," IEEE Spoken Language Technology Workshop (SLT), 2018, 8 pages.

Henderson et al., "Robust dialog state tracking using delexicalised recurrent neural networks and unsupervised adaptation," IEEE Spoken Language Technology Workshop (SLT), 2014, 6 pages.

Erion et al., "Learning explainable models using attribution priors," arXiv:1906.10670v2 [cs.LG], 2019, 39 pages.

Pandey et al., "Mask & Focus: Conversation Modelling by Learning Concepts," reprearXiv:2003.04976v1 [cs.CL], 2020, 8 pages.

Ribeiro et al., "Why should I trust you? Explaining the predictions of any classifier," arXiv:1602.04938v3 [cs.LG], 2016, 10 pages.

Lundberg et al., "A unified approach to interpreting model predictions," 31st Conference on Neural Information Processing Systems, 2017, 10 pages.

Murdoch et al., "Beyond Word Importance: Contextual Decomposition to Extract Interactions from LSTMs," arXiv:1801.05453v2 [cs.CL], 2018, 15 pages.

Chen et al., "Learning to explain: An information-theoretic perspective on model interpretation," arXiv:1802.07814v2 [cs.LG], 2018, 10 pages.

Lipton, "The mythos of model interpretability," Machine Learning, 28 pages.

Jacovi et al., "Towards Faithfully Interpretable NLP Systems: How should we define and evaluate faithfulness?," arXiv:2004.03685v3 [cs.CL], 2020, 8 pages.

Singh et al., "Hierarchical interpretations for neural network predictions," arXiv:1806.05337v2 [cs.LG], 2018, 26 pages.

Singla et al., "Understanding impacts of high-order loss approximations and features in deep learning interpretation," arXiv:1902.00407v2 [cs.LG], 2019, 20 pages.

Tsang et al., "Feature Interaction Interpretability: A Case for Explaining Ad-Recommendation Systems via Neural Interaction Detection," arXiv:2006.10966v1 [stat.ML], 2020, 19 pages.

Janizek et al., "Explaining Explanations: Axiomatic Feature Interactions for Deep Networks," arXiv:2002.04138v3 [cs.LG], 2020, 38 pages.

Chen et al., "Generating hierarchical explanations on text classification via feature interaction detection," arXiv:2004.02015v3 [cs.CL], 2020, 16 pages.

Camburu et al., "Can I trust the explainer? Verifying post-hoc explanatory methods," arXiv:1910.02065v3 [cs.CL], 2019, 13 pages.

Ribeiro et al., "Anchors: High-Precision Model-Agnostic Explanations," The Thirty-Second AAAI Conference on Artificial Intelligence, 2018, 9 pages.

Zhang et al., "Interpreting Hierarchical Linguistic Interactions in DNNs," arXiv:2007.04298v2 [cs.CL], 2020, 9 pages.

Sankar et al., "Deep Reinforcement Learning for Modeling Chit-Chat Dialog With Discrete Attributes," arXiv:1907.02848v2 [cs.LG], 2019, 10 pages.

Zhao et al., "Unsupervised Discrete Sentence Representation Learning for Interpretable Neural Dialog Generation," arXiv:1804.08069v1 [cs.CL], 2018, 11 pages.

Madan et al., "Unsupervised Learning of Interpretable Dialog Models," arXiv:1811.01012v1 [cs.AI], 2018, 8 pages.

Chen et al., "Spoken lecture summarization by random walk over a graph constructed with automatically extracted key terms," 12th Annual Conference of the International Speech Communication Association, 2011, 5 pages.

Yuan et al., "Abstractive Dialog Summarization with Semantic Scaffolds," arXiv:1910.00825v1 [cs.CL], 2019, 14 pages.

Goo et al., "Abstractive dialogue summarization with sentence-gated modeling optimized by dialogue acts," arXiv:1809.05715v2 [cs.CL], 2018, 8 pages.

* cited by examiner

700

T1

U: I want discounts for a new account.

T2

U: I want discounts for a new account.

A: You are not eligible for them.

PAIR SIGNIFICANCE
- AND
- XOR

T3

U: I want discounts for a new account.

A: You are not eligible for them.

U: How about for existing users?

TOKEN SIGNIFICANCE
- HUB
- CONTENT

U1: I want no more paper statements, online claims instead please.

A1: Have you registered any online account before?

U2: Not too sure.

A2: Unfortunately, you cannot check your claims without an online account.

U3: #WrongInterpretation. What kind of online accounts are you talking about? ▶

904

U1: I want no more paper statements, online claims instead please.

A1: Have you registered any online account before?

U2: Just did.

A2: Unfortunately, you cannot check your claims without an online account.

U3: #WrongReply. What kind of online accounts are you talking about? ▶

FIG. 9

INTERPRETATION OF DEEP NEURAL MODEL BASED DIALOGUE AGENTS

BACKGROUND

The subject disclosure relates to machine learning, and more specifically, to techniques for interpreting the results of a machine learning model used by a dialogue agent.

Advancements in computing technology have facilitated automation of an increasing number of tasks. For instance, dialogue agents can utilize natural language processing techniques, e.g., based on a machine learning model, to enable a computer system to engage in conversation with a human user. This, in turn, can facilitate automation of various customer support, troubleshooting, and/or other tasks. While recent advancements in end-to-end conversational agents and dialogue response generation have enabled joint modeling of semantic contexts for retrieving or reasoning over associated knowledge for meaningful dialogue tasks, there are still technical hurdles associated with exploiting these advances for assisting end users on goal-oriented tasks in a deployed system. For example, neural models underlying dialogue agents typically operate in an opaque manner and do not provide interpretative cues that can be utilized by human users to gain understanding and trust in the manner in which a dialogue agent generates responses.

Conventional techniques for interpreting dialogue models are generally specific to a given model and operate based on the parameters of that model. For instance, Kim et al., "UTILIZING A DYNAMIC MEMORY NETWORK TO TRACK DIGITAL DIALOG STATES AND GENERATE RESPONSES," U.S. Patent Application Publication No. 2020/0090641, provides techniques for generating a response in a dialogue system based on a state associated with the system. For instance, paragraph 6 of Kim et al. states that "[a]fter processing each segment of digital dialog, the dialog state tracking neural network determines a digital dialog state based on the final slot values, and the disclosed systems generate a digital response to the segment based on the determined state." However, as noted above, there exists a need in the art for solutions to interpret the results of a dialogue model where the states and/or other parameters of the model are not known.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate interpretation of deep neural model based dialogue agents are described.

According to an embodiment, a system can include a memory that stores computer executable components and a processor that executes computer executable components stored in the memory. The computer executable components can include a feature extraction component that extracts features from a dialogue model independently from the dialogue model, where the features include input features provided to the dialogue model and output features produced via the dialogue model in response to the input features. The computer executable components can further include a model interpreter component that analyzes a dialogue context associated with the features extracted by the feature extraction component by identifying pairwise interactions between respective ones of the features. The system according to this embodiment has the advantages of improved accuracy of a dialogue model, improved user experience and trust with respect to the output of a dialogue agent, and facilitation of automated tasks that could not previously be automated, among other advantages.

In certain embodiments, the computer executable components can further include a feature constructor component that can generate visual representations of the pairwise interactions between selected ones of the features and facilitate respectively rendering the visual representations on a display device. The system according to this embodiment has the advantage of improved accuracy of automation tasks performed on a computing system via the dialogue model, among other advantages. In other embodiments, the computer executable components can further include a feature aggregator component that computes interaction scores for respective ones of the pairwise interactions identified by the model interpreter component based on a feature significance criterion and a feature selector component that selects the selected ones of the features based on the interaction scores computed by the feature aggregator component. The system according to this embodiment has the advantage of further improved accuracy of automation tasks performed on a computing system via the dialogue model, among other advantages. In further embodiments, the feature significance criterion can include a criterion selected from a group comprising role significance, dialogue turn significance, dialogue token significance, and token pair relationship significance. The system according to this embodiment has the advantage of enabling interpretation of dialogue model features across multiple different contexts, resulting in improved robustness of model interpretation, among other advantages. In still other embodiments, the pairwise interactions can comprise an interaction between a first feature and a second feature of the features as selected from a group comprising a negation of the first feature by the second feature and anaphora exhibited by the first feature and the second feature. The system according to this embodiment has the advantage of improved model interpretation accuracy by enabling granular analysis of dialogue context, among other advantages. In further embodiments, the visual representations generated by the feature constructor component can include visual emphasis of the first feature and the second feature and an annotation of the interaction between the first feature and the second feature. The system according to this embodiment has the advantage of increased user trust in dialogue agent output through enhanced visualization of that output, among other advantages. In further embodiments, the computer executable components can also include a user feedback component that receives user preferences corresponding to the visual representations, where the feature selector component selects the selected ones of the features further based on the user preferences. The system according to this embodiment has the advantage of improved user experience and interactivity with a dialogue model interpreter, among other advantages. In other embodiments, the feature constructor component can facilitate respectively rendering the visual representations as an overlay to displayed output features rendered via the dialogue model. The system according to this embodiment has the advantage of increased user trust in dialogue agent output through enhanced visualization of that output, among other advantages.

According to another embodiment, a computer-implemented method can include extracting, by a device operatively coupled to a processor, features from a dialogue model independently from the dialogue model, the features including input features provided to the dialogue model and output features produced via the dialogue model in response to the input features, resulting in extracted features. The computer-implemented method can further include analyzing, by the device, a dialogue context associated with the extracted features by identifying pairwise interactions between respective ones of the extracted features. The computer-implemented method according to this embodiment has the advantages of improved accuracy of a dialogue model, improved user experience and trust with respect to the output of a dialogue agent, and facilitation of automated tasks that could not previously be automated, among other advantages.

In certain embodiments, the computer-implemented method can further include generating, by the device, visual representations of the pairwise interactions between selected features of the extracted features, and facilitating, by the device, respectively rendering the visual representations on a display device. The computer-implemented method according to this embodiment has the advantage improved accuracy of automation tasks performed on a computing system via the dialogue model, among other advantages. In further embodiments, the computer-implemented method can include computing, by the device, interaction scores for respective ones of the pairwise interactions between the respective ones of the extracted features based on a feature significance criterion, and selecting, by the device, the selected features of the extracted features based on the interaction scores. The computer-implemented method according to this embodiment has the advantage of further improved accuracy of automation tasks performed on a computing system via the dialogue model, among other advantages. In additional embodiments, the feature significance criterion can include a criterion selected from a group comprising role significance, dialogue turn significance, dialogue token significance, and token pair relationship significance. The computer-implemented method according to this embodiment has the advantage of enabling interpretation of dialogue model features across multiple different contexts, resulting in improved robustness of model interpretation, among other advantages. In still other embodiments, the pairwise interactions between the respective ones of the extracted features can include an interaction between a first feature and a second feature of the extracted features as selected from a group comprising a negation of the first feature by the second feature and anaphora exhibited by the first feature and the second feature. The computer-implemented method according to this embodiment has the advantage of improved model interpretation accuracy by enabling granular analysis of dialogue context, among other advantages. In further embodiments, the computer-implemented method can include receiving, by the device, user preferences corresponding to the visual representations, and selecting, by the device, the selected features further based on the user preferences. The computer-implemented method according to this embodiment has the advantage of improved user experience and interactivity with a dialogue model interpreter, among other advantages.

According to a further embodiment, a computer program product for interpreting a deep neural model-based dialogue agent can include a non-transitory computer readable storage medium having program instructions embodied therewith. The program instructions can be executable by a processor to cause the processor to extract features from a dialogue model independently from the dialogue model, the features including input features provided to the dialogue model and output features produced via the dialogue model in response to the input features, resulting in extracted features. The instructions can be further executable by the processor to cause the processor to analyze a dialogue context associated with the extracted features by identifying pairwise interactions between respective ones of the extracted features. The computer program product according to this embodiment has the advantages of improved accuracy of a dialogue model, improved user experience and trust with respect to the output of a dialogue agent, and facilitation of automated tasks that could not previously be automated, among other advantages.

In certain embodiments, the program instructions can cause the processor to generate visual representations of the pairwise interactions between selected features of the extracted features and facilitate respectively rendering the visual representations on a display device. The computer program product according to this embodiment has the advantage of improved accuracy of automation tasks performed on a computing system via the dialogue model, among other advantages. In other embodiments, the program instructions can cause the processor to compute interaction scores for respective ones of the pairwise interactions between the respective ones of the extracted features based on a feature significance criterion and select the selected features of the extracted features based on the interaction scores. The computer program product according to this embodiment has the advantage of further improved accuracy of automation tasks performed on a computing system via the dialogue model, among other advantages. In still other embodiments, the feature significance criterion can include a criterion selected from a group comprising role significance, dialogue turn significance, dialogue token significance, and token pair relationship significance. The computer program product according to this embodiment has the advantage of enabling interpretation of dialogue model features across multiple different contexts, resulting in improved robustness of model interpretation, among other advantages. In further embodiments, the pairwise interactions between the respective ones of the extracted features can include an interaction between a first feature and a second feature of the extracted features as selected from a group comprising a negation of the first feature by the second feature and anaphora exhibited by the first feature and the second feature. The computer program product according to this embodiment has the advantage of improved model interpretation accuracy by enabling granular analysis of dialogue context, among other advantages. In additional embodiments, the program instructions can cause the processor to receive user preferences corresponding to the visual representations and select the selected features further based on the user preferences. The computer program product according to this embodiment has the advantage of improved user experience and interactivity with a dialogue model interpreter, among other advantages.

DESCRIPTION OF THE DRAWINGS

FIGS. 7-8 are diagrams depicting respective classes of feature interactions that can be analyzed and interpreted according to one or more embodiments described herein.

FIG. 9 is a diagram depicting example visual representations that can be rendered for a dialogue model according to one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
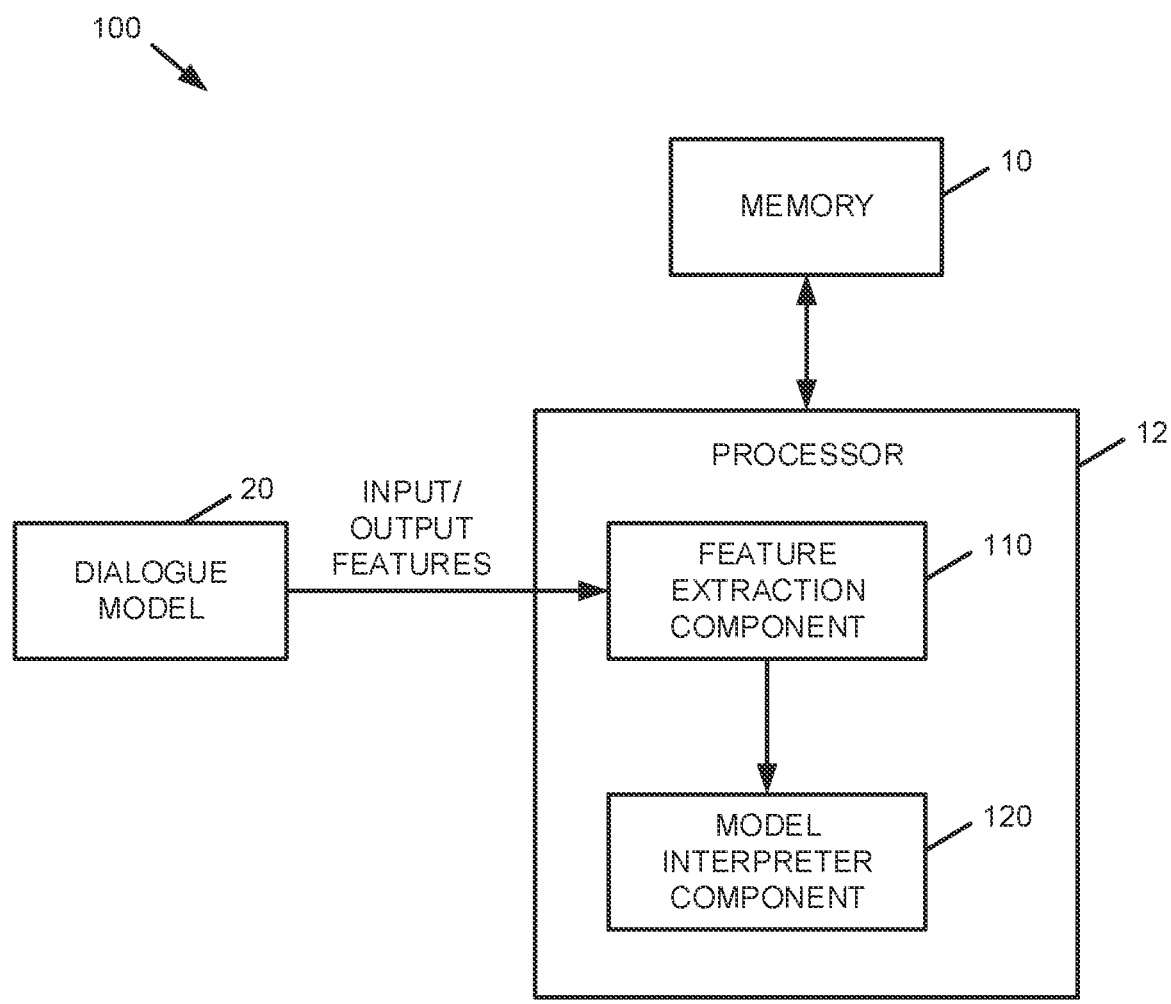
FIG. 1 is a block diagram of a system that facilitates interpretation of deep neural model based dialogue agents according to one or more embodiments described herein.

With reference now to the drawings, FIG. 1 illustrates a block diagram of a system 100 that facilitates interpretation of deep neural model based dialogue agents according to one or more embodiments described herein. As shown in FIG. 1, system 100 includes a memory 10 that can store computer executable components and a processor 12 that can execute computer executable components stored in the memory 10. The computer executable components executed by the processor 12 can include a feature extraction component 110 that can extract features from a dialogue model 20 independently from the dialogue model 20, e.g., such that the feature extraction component 110 can extract the features from the dialogue model 20 without direct access to the operating parameters of the dialogue model 20. In this way, as will be described in further detail below, various aspects provided herein can interpret the results of a dialogue model 20 in a model-agnostic manner, enabling processing of a dialogue model 20 that is presented as a "black box" for which the inner workings of the dialogue model 20 are shielded from access. In an aspect, the features extracted by the feature extraction component 110 can include input features provided to the dialogue model 20 as well as output features produced via the dialogue model 20 in response to the input features.

As further shown by FIG. 1, the computer executable components executed by the processor 12 can additionally include a model interpreter component 120 that can analyze a dialogue context associated with the features extracted by the feature extraction component 110 by identifying pairwise interactions between respective ones of the features. Various examples of these pairwise feature interactions are described in further detail below with respect to FIGS. 3, 7, and 8. In an aspect, identifying and further processing pairwise feature interactions as described herein provides a solution to the problem of improving reliability and accuracy of results generated by a deep neural model based dialogue agent. In various aspects, by facilitating interpretation of deep neural model based dialogue agents, various advantages can be realized relating to the functionality of a computing system. These advantages can include, but are not limited to, reduced computing resources (power usage, processing cycles, or the like) utilized by a computing system in connection with generating inaccurate or unreliable dialogue agent output, the ability to automate of certain language processing tasks that could not previously be automated and/or improve automation of automatable language processing tasks, etc. Other advantages could also be realized.

As described above, the processor 12 can be utilized to implement one or more of the feature extraction component 110 and/or the model interpreter component 120. The processor 12 can be connected via a data bus (not shown in FIG. 1) to one or more additional sub-components, such as the memory 10 and/or other suitable sub-components. In various embodiments, the processor 12 shown in FIG. 1 can be or include hardware, software (e.g., a set of threads, a set of processes, software in execution, etc.) or a combination of hardware and software that performs a computing task (e.g., a computing task associated with received data). For example, the processor 12 can process large amounts of complex, multidimensional data samples and/or perform other operations that cannot be performed by a human (e.g., are greater than the capability of a human mind). For example, the amount of data processed, the speed of processing of the data and/or the data types processed by the processor 12 over a certain period of time can be respectively greater, faster and different than the amount, speed and data type that can be processed by a single human mind over the same period of time. For example, data processed by the processor 12 can be raw data (e.g., raw textual data, raw numerical data, etc.) and/or compressed data (e.g., compressed textual data, compressed numerical data, etc.) associated with one or more computing devices. Moreover, the processor 12 can be fully operational towards performing one or more other functions (e.g., fully powered on, fully executed, etc.) while also processing the above-referenced data.

While the processor 12 is shown in FIG. 1 as a single component, it should be appreciated that functionality of the processor 12 could be distributed among multiple processing units and/or other hardware elements within a single computing device and/or multiple communicatively coupled computing devices. Additionally, it should be appreciated that the various computer executable components shown in FIG. 1 and the figures that follow could be implemented via a memory 10 and processor 12 in a similar way to that described above.

In an aspect, system 100 as shown in FIG. 1 can be utilized to interpret a deep neural model based dialogue agent, e.g., by identifying pairwise input-unit feature interactions for interpreting model behavior, where the selected features can range from token-level to turn-level significance for a conversation. Various types of feature significance that can be analyzed by system 100 are described in more detail with respect to FIGS. 7-8. Additionally, as will be discussed in further detail below beginning with FIG. 4, various aspects herein can process feature attributions (e.g., as determined by the model interpreter component 120) for dynamic illustrations that are suitable to present to human users, e.g., for interpretation and solicitation of in-context feedback.

In another aspect, the model interpreter component 120 of system 100 can be trained to learn local model-agnostic explanations of individual predictions using an inference network for approximating interactions between feature pairs, as will be described in further detail below with respect to FIG. 4. This process can include effectively approximating the features with which a dialogue model 20 makes decisions and finding alignment between feature attributions and human-comprehensive semantics, among other operations. Additionally, various aspects as described herein can operate without the use of model-specific interpretations and/or without the use of domain-specific or dialog-specific attributes.

Figure 2:
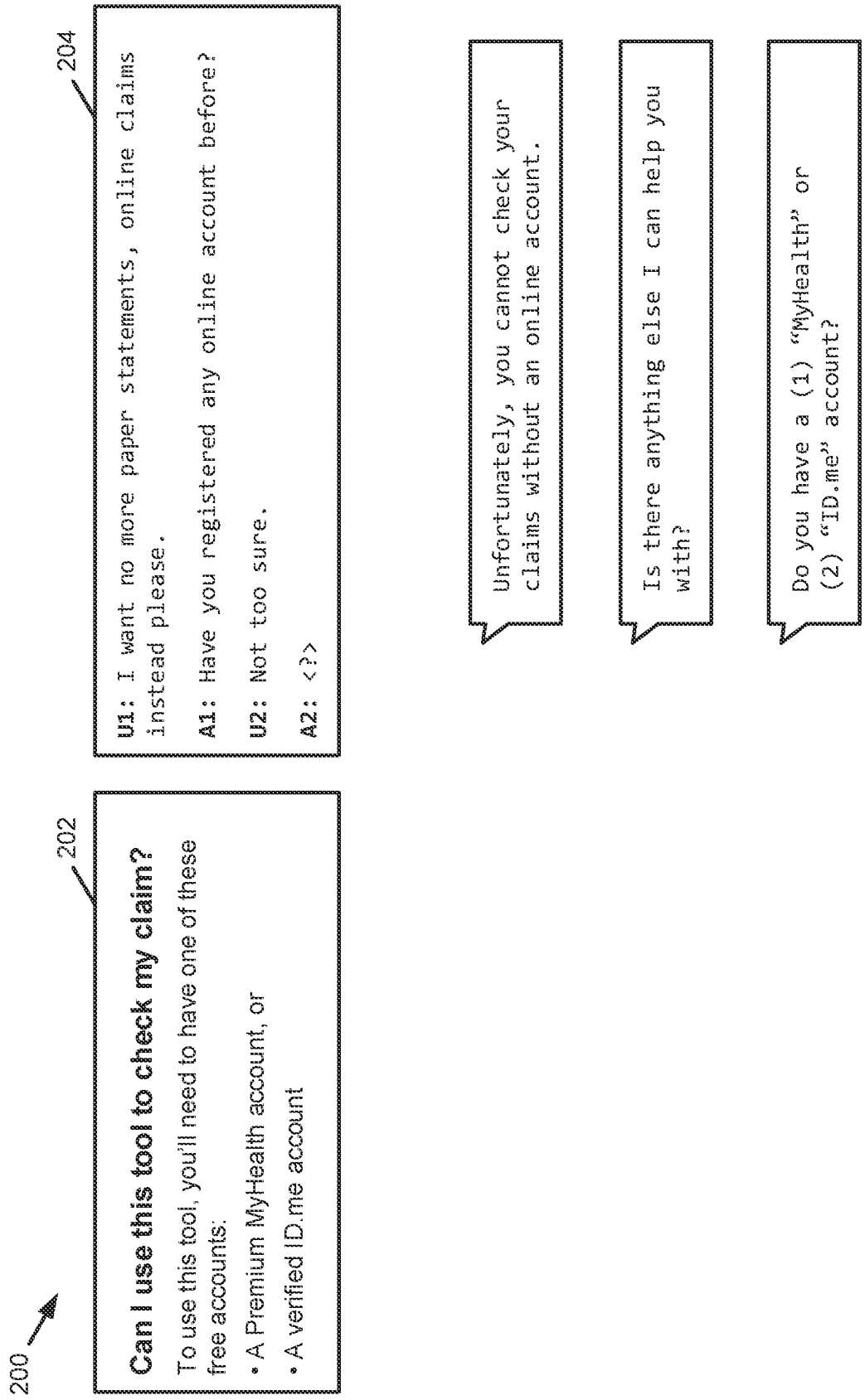
FIG. 2 is a diagram depicting respective input features and output features that can be extracted from a deep neural model based dialogue agent according to one or more embodiments described herein.

With reference next to FIG. 2, diagram 200 depicts respective examples of input features and output features that can be extracted by the feature extraction component 110 from a deep neural model, e.g., a dialogue model 20, according to one or more embodiments described herein. As shown in diagram 200, the respective input features to the dialogue model 20 can include a set of domain knowledge 202 that is indicative of a context in which the dialogue model 20 operates. In the example shown in diagram 200, the context of the dialogue model 20 is an automated customer support agent for online health insurance claims. It should be appreciated, however, that this is merely one example of a context that could be utilized and that any other suitable dialogue context could also be considered without departing from the scope of this description. As part of the domain knowledge 202 shown in diagram 200, access by a user to online claims is conditioned upon the user having one of two types of accounts, here a "MyHealth" and/or an "ID.me" account.

As further shown in diagram 200, input features provided to a dialogue model 20 can also include a dialogue history 204 that represents previous exchanges between a human user and an automated dialogue agent based on the dialogue model 20. As shown in the dialogue history 204, statements made by the human user are represented with the letter U followed by a number (e.g., U1 and U2), while statements made by the automated agent are represented with the letter A followed by a number (e.g., A1 and A2). As used herein, a statement made by either the human user or the dialogue agent is referred to as a "turn." Thus, the dialogue history 204 shows a dialogue composed of turns U1, A1 and U2. As further shown in diagram 200, the dialogue model 20 can provide an output utterance at turn A2 based on the domain knowledge 202 and the dialogue history 204, which can then be processed as an output feature. The speech windows below the dialogue history 204 in diagram 200 represent possible output utterances that can be generated by the dialogue model 20 based on these and/or other inputs.

Figure 3:
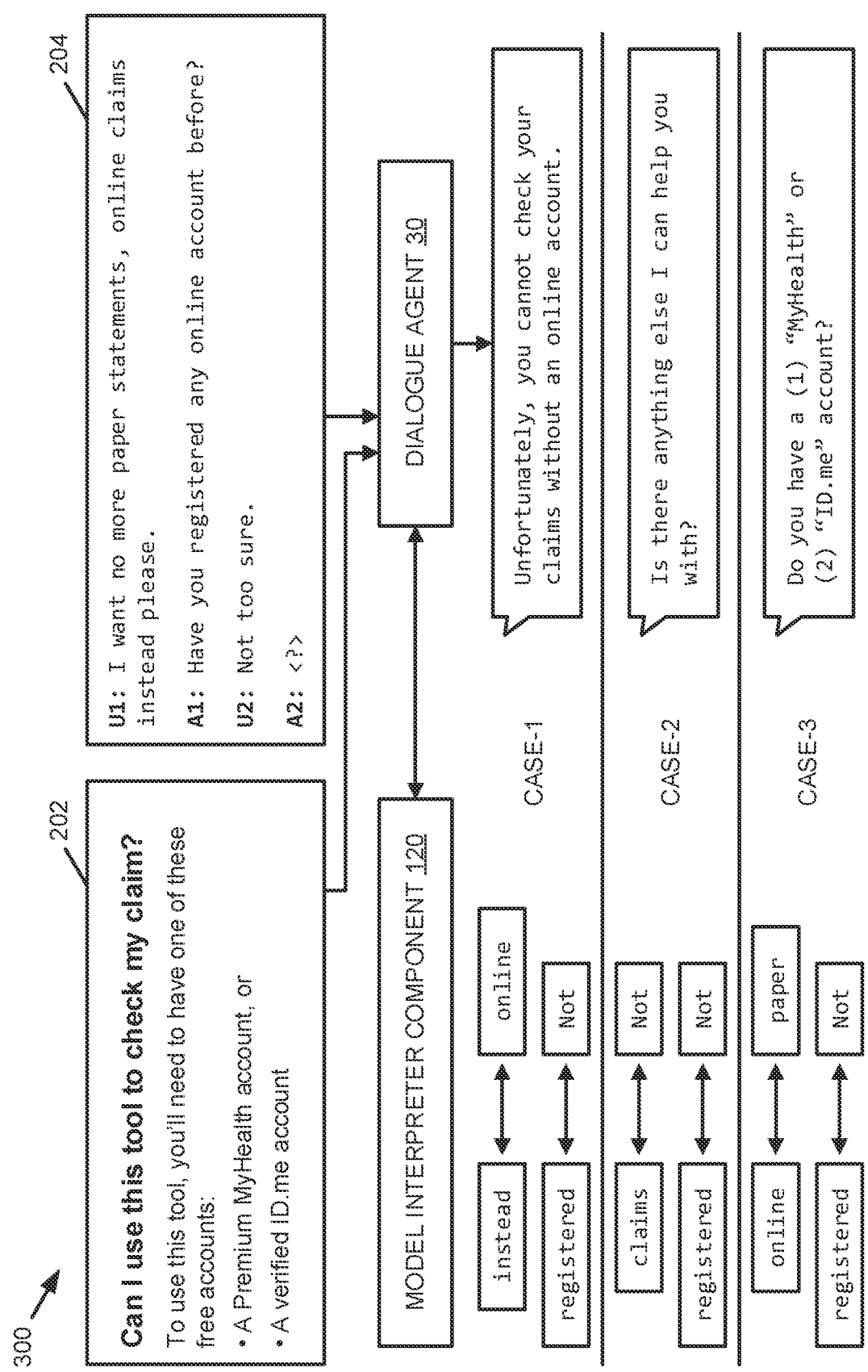
FIG. 3 is a diagram depicting respective interpretations of the input features and output features shown in FIG. 2 according to one or more embodiments described herein.

As further shown by diagram 300 in FIG. 3, the model interpreter component 120 of system 100 can analyze the domain knowledge 202, the dialogue history 204, and/or any other input features, as well as an output provided by a dialogue agent 30 associated with the dialogue model 20, to interpret the process by which the dialogue agent 30 arrived at a given output. For instance, diagram 300 illustrates a series of three potential cases representing various outputs that could be returned by the dialogue agent 30 and respective pairwise feature interactions, e.g., relationships between given pairs of words or phrases in the dialogue history 204 based on the domain knowledge 202, that are associated with those corresponding outputs.

In the example shown by diagram 300, the statement "Not too sure" at turn U2 does not represent an affirmative yes or no response but is instead an expression of lack of information by the user, e.g., as to whether the user has registered a qualifying account. Accordingly, the correct response from the dialogue agent 30 in this scenario would be case 3, in which the dialogue agent 30 provides the user at turn A2 with further information to enable the user to more accurately determine whether they have registered, or could register, for a relevant online account. If, instead, the dialogue agent 30 returns output associated with cases 1 or 2, the model interpreter component 120 can analyze pairwise feature interactions as shown by diagram 300 to facilitate an understanding of the reason(s) why the dialogue agent 30 arrived at an incorrect response. For instance, as in case 1, if the dialogue agent 30 determines that the word "not" as used in the dialogue history 204 modifies "registered," it can come to the potentially incorrect conclusion that the user has not registered an online account. Similarly, as in case 2, if the dialogue agent 30 determines that the word "not" modifies "claims," it can come to the similarly incorrect conclusion that the user is not requesting assistance. In an aspect, the model interpreter component 120 can facilitate an understanding by the user of the rationale used by the dialogue agent 30 in arriving at its output at turn U2, thereby enabling the user to better understand and/or correct the operation of the dialogue agent 30.

In an aspect, the model interpreter component 120 can operate as a separate model, e.g., a separate machine learning model, from the dialogue model 20 associated with the dialogue agent 30. In particular, the model interpreter component 120 can conduct post-hoc analysis to recreate and/or approximate the operations of a well-trained dialogue model 20 in a model-agnostic manner, e.g., without knowledge of the specific parameters of the dialogue model 20. Techniques that can be utilized by the model interpreter component 120 in this way are described in further detail below with respect to FIG. 108.

Figure 4:
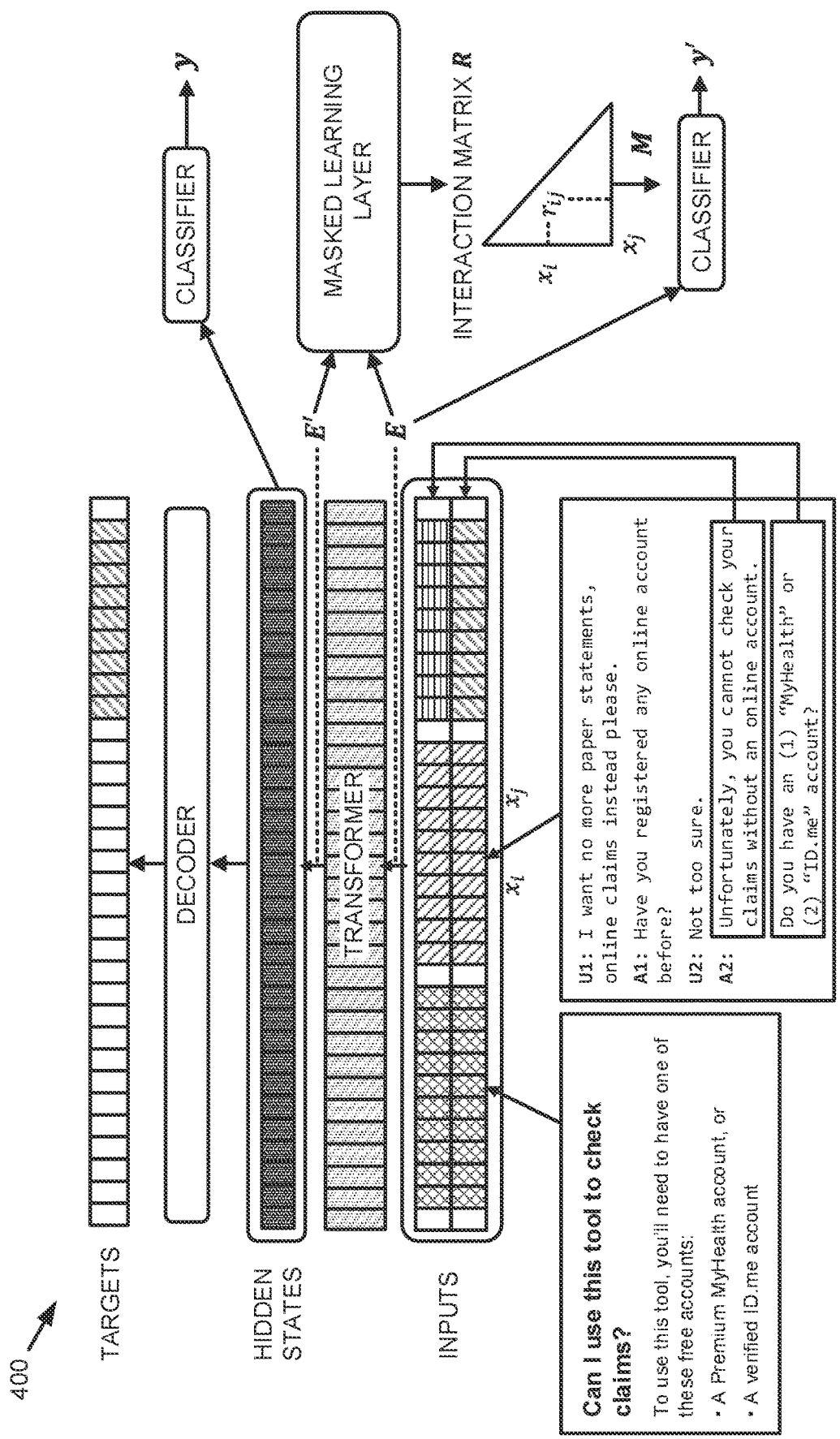
FIG. 4 is a diagram depicting example operation of a model interpreter for a deep neural model based dialogue agent according to one or more embodiments described herein.

Turning now to FIG. 4, a diagram 400 is provided that depicts example operations that can be performed by the model interpreter component 120 with respect to the dialogue agent 30 of FIG. 3 according to one or more embodiments described herein. As shown in diagram 400, the dialogue agent 30 can accept domain knowledge as input to provide context to the associated conversation. Additionally, the dialogue agent 30 can accept as inputs respective input features $x_{1...n}$ associated with a dialogue history, e.g., as described above with respect to FIG. 3. The dialogue agent 30 can then utilize an encoder, which is observed as a black-box encoder by the model interpreter component 120, to transform the input features into a selected output feature, which can then be decoded by the dialogue agent 30 into an output utterance.

In an aspect, to detect the feature interactions that occur in the encoder of a black-box dialogue model, the model interpreter component 120 can utilize an inference network to learn correlations between respective pairs of features. For instance, the model interpreter component 120 can extract the input and output feature representations from the black-box encoder and combine them to obtain a promoted input. The model interpreter component 120 can then generate an interaction matrix R for the promoted input, where each element $r_{ij}$ in the matrix R represents an interaction score between two corresponding features $x_i$ and $x_j$.

The model interpreter component 120 can be trained for a given set of input data in order to learn local feature interactions and attributions. During the learning process, each element in the interaction matrix can be defined as a random variable, e.g., a random variable according to a Bernoulli distribution. Based on this definition, the model interpreter component 120 can learn approximate distributions for the posterior distributions of the random variables, e.g., via amortized variational inference. More particularly, the model interpreter component 120 can sample a binary value from each Bernoulli distribution, where a value of 1 indicates that there is a correlation between two corresponding features and a value of 0 indicates no correlation. The model interpreter component 120 can then map the interaction matrix to a word mask vector, e.g., by aggregating the interaction values related to a feature individually. Subsequently, the model interpreter component 120 can employ an input ablation method to blank out input word embeddings with a mask vector through element-wise multiplication and forward the masked input to the black-box model to obtain a new output. The new output from the black-box model can then be supervised by the original model prediction on the input data to guide the model interpreter component 120 to identify correct feature interactions.

Also or alternatively, the model interpreter component 120 can add an additional regularization term, which can represent the negative entropy of random variables in the interaction matrix to make the interaction matrix sparse. As a result, most of the learned posterior Bernoulli distributions will exhibit probabilities closing to approximately 0.5, representing irrelevant feature interactions. Other resulting posterior distributions will have probabilities closing to approximately 1, representing significant feature interactions, and the remaining posterior distributions will have probabilities closing to approximately 0, representing insignificant feature interactions. In response to training the model interpreter component 120 in this manner, the model interpreter component 120 can utilize the expectations on random variables in the interaction matrix as feature interaction scores. The model interpreter component 120 can further aggregate the feature interaction scores to obtain feature attributions. In an aspect, the feature interaction scores obtained in this manner can be utilized to generate visual representations of the model features and their interactions, as will be described in further detail below with respect to FIG. 6.

Figure 5:
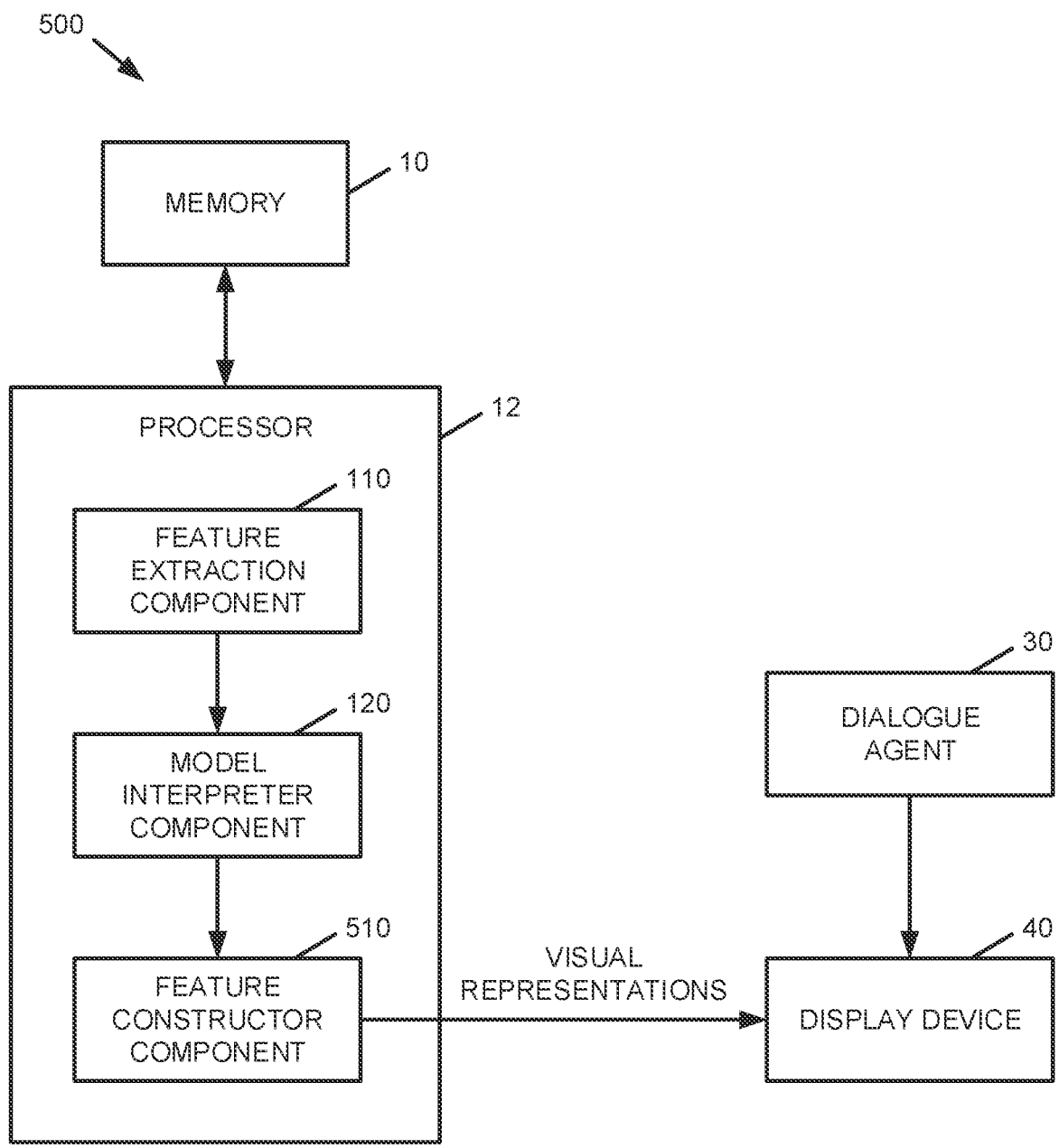
FIG. 5 is a block diagram of a system that facilitates visual representations of extracted and interpreted dialogue model features according to one or more embodiments described herein.

Referring next to FIG. 5, a block diagram of a system 500 that facilitates visual representations of extracted and interpreted dialogue model features according to one or more embodiments described herein is illustrated. Repetitive description of like elements employed in other embodiments described herein is omitted for brevity. As shown in FIG. 4, the computer executable components that can be stored on the memory 10 and executed by the processor 12 include a feature constructor component 510 that can generate visual representations of the pairwise feature interactions identified by the model interpreter component 120 as described above. The feature constructor component 510 can further facilitate rendering of the visual representations on a display device 40, e.g., a monitor, a touch screen, and/or any other suitable device. Additionally, as further described below with respect to FIG. 9, the visual representations generated by the feature constructor component 510 can be rendered as an overlay to displayed output features rendered by a dialogue agent 30, e.g., a dialogue agent 30 associated with a dialogue model 20 analyzed by the model interpreter component 120.

Figure 6:
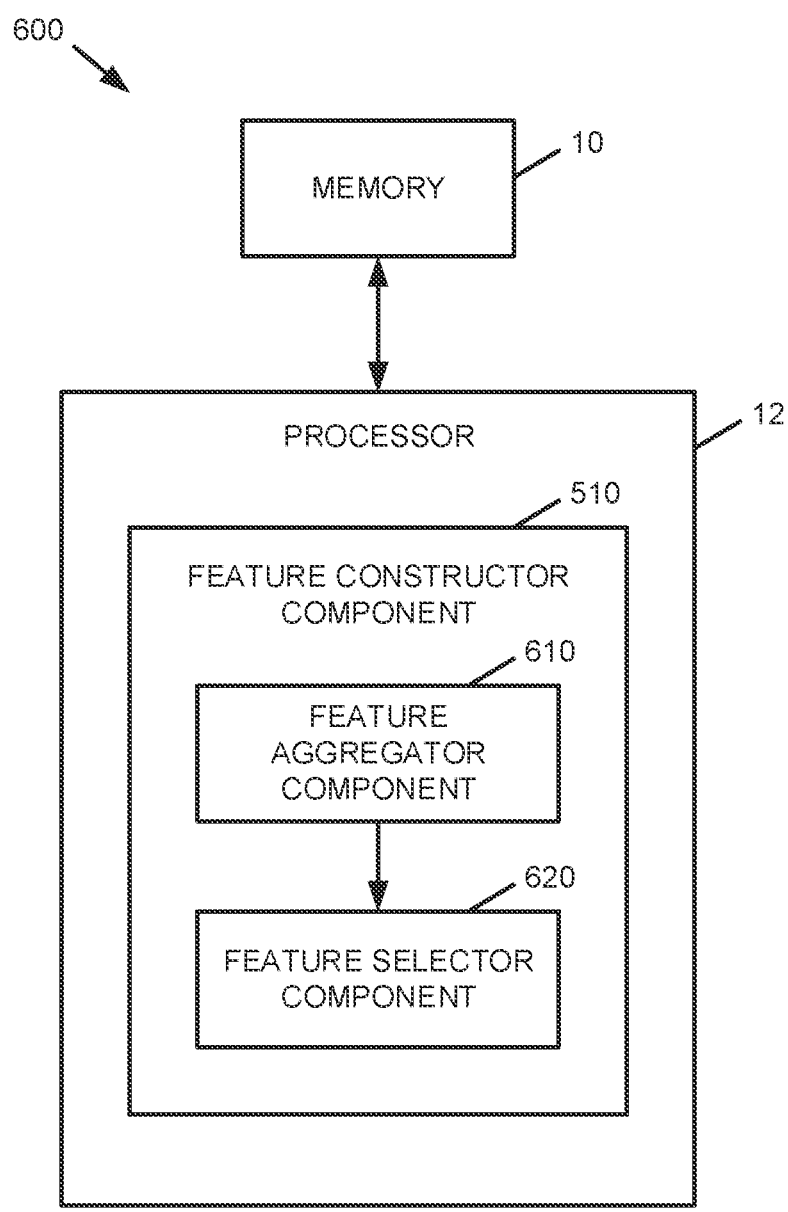
FIG. 6 is a block diagram of a system that facilitates construction of visual representations for extracted and interpreted dialogue model features according to one or more embodiments described herein.

Referring now to FIG. 6, a block diagram of a system 600 that facilitates construction of visual representations for extracted and interpreted dialogue model features according to one or more embodiments described herein is illustrated. Repetitive description of like elements employed in other embodiments described herein is omitted for brevity. More particularly, system 600 in FIG. 6 illustrates the operation of the feature constructor component 510 of system 500 in further detail. As shown in FIG. 6, system 600 can include a feature aggregator component 610 that can compute interaction scores for respective pairwise interactions, e.g., as identified by the model interpreter component 120 as described above, based on a feature significance criterion. System 600 further includes a feature selector component 620 that can select respective features, e.g., for display, based on the interaction scores computed by the feature aggregator component 610. While the feature aggregator component 610 and the feature selector component 620 are illustrated in FIG. 6 as part of the feature constructor component 510, it should be appreciated that some or all of the functionality of the feature aggregator component 610 and the feature selector component 620 could be implemented separately from the feature constructor component 510.

In an aspect, given the feature attribution scores determined by the model interpreter component 120 as described above, the feature constructor component 510 can generate appropriate representations that serve as a model interpretation for human comprehension, e.g., such that end users can be better able to observe the interpretation, assess the performance of the underlying dialogue model 20, and provide feedback. In another aspect, the feature constructor component 510 can operate without relying on predefined semantic attributes or domain entities. Instead, the feature constructor component 510 can leverage n-gram level analysis that can be used to aggregate and characterize dialogue at higher levels, such as the role, interlocutor and turn levels.

In a further aspect, for better presenting a model interpretation to end users, the feature constructor component 510 can illustrate various levels of feature attributions based on a graphical model derived from feature interaction results. For instance, attributions can include feature pair significance at the token/n-gram, role/interlocutor, and/or turn levels. An illustrative example of different types of feature significance that can be identified and displayed for a user at respective turns of a dialogue is shown by diagrams 700 and 702 in FIGS. 7 and 8, respectively. With reference first to diagram 700 in FIG. 7, the example dialogue begins at turn T1, in which a user presents an inquiry to a dialogue agent regarding discounts for a new account. Turn T2 in diagram 700 then illustrates an example of feature pair significance that can be displayed by the feature constructor component 510, here the relationship between "discounts" and "new." Next, during turn T3, the feature constructor component 510 can display a visual representation of single dialogue token/n-gram significance, here the relationship between the term "discounts" and the agent response indicating that the user is not eligible for the requested discounts. Additionally, as further shown by diagram 702 in FIG. 8, the feature constructor component can display visual representations relating to dialogue turn significance at turn T4, here the relationship between the term "discounts" from turn T1 and the relationship between "new" and "existing" users from turns T1 and T3, respectively. As further illustrated by diagram 702, turn significance can be utilized to illustrate intent behind a particular utterance and/or an evolution of a dialogue act over a series of turns. Additionally, while not shown in diagrams 700 or 702, further illustrations can also be provided by the feature constructor component 510 relating to role significance, e.g., significance relating to an actor's role (e.g., user or agent) and/or the relationship between multiple roles. Other types of significance could also be utilized and/or displayed.

Returning to FIG. 6, given a current user turn and a dialogue history, the feature aggregator component 610 can accept the current feature interactions as input and compute various types of interpretation, e.g., interpretation types corresponding to the respective forms of significance described above with respect to FIGS. 7-8. In an aspect, the feature aggregator component 610 can directly select a token-pair relationship from current feature interactions having interaction scores above a given threshold. For single token/n-gram significance, these interaction scores can be combined based on graphical models and/or by other means. For turn and/or interlocutor significance, the feature aggregator component 610 can obtain an interaction score in at least two ways, e.g., either (1) by aggregating the token-level feature interaction scores for the corresponding turn/role/interlocutor or (2) by directly modeling the input-unit feature as a turn/role/interlocutor when the embeddings and encoding information are available from the original model input, e.g., by using the same approach as for detecting token-level feature interactions. Other techniques could also be used.

In an aspect, given a dialogue context and feature significance scores, the feature selector component 620 can determine which features to present to a human user via a user interface for their reference. The feature selector component 620 can be customizable (e.g., based on user feedback, as discussed below with respect to FIG. 11) to focus on different aspects of semantic interpretation. These aspects can include generic lexical semantics involving functional words that play roles in compositional meanings, e.g., A-negate-B, A-referred-as-B, etc. These aspects can also include relationships between content words at the n-gram level that indicate task-related specific knowledge. These aspects can further include higher level significance for a certain turn and/or interlocutor that indicates the subtasks and/or dialogue segmentations.

Figure 8:
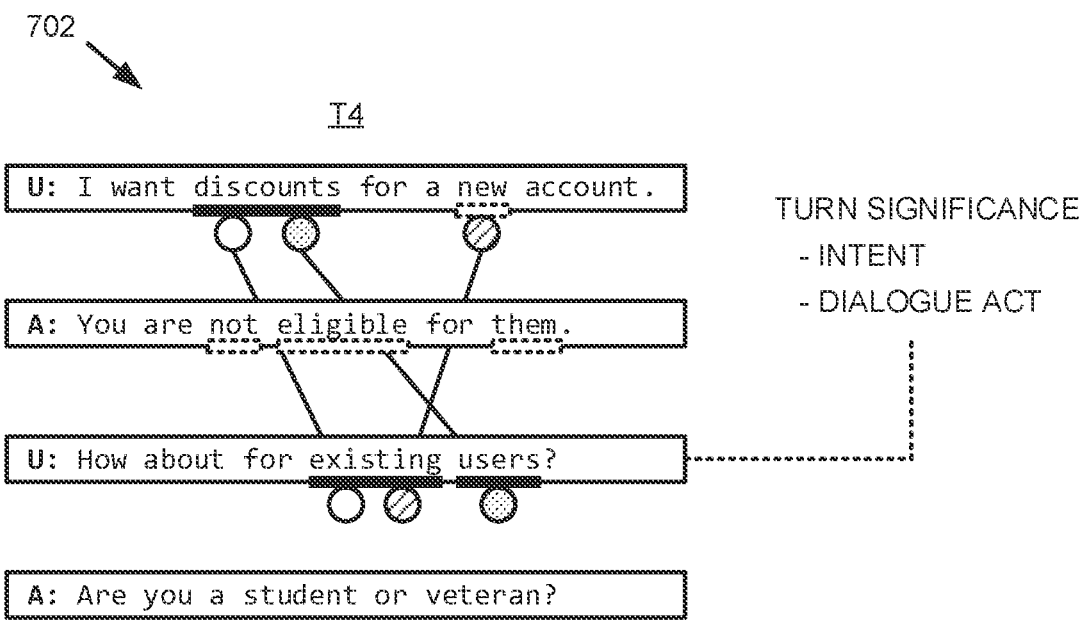

Turning now to FIG. 9, diagram 900 depicts example visual representations that can be rendered by the feature constructor component 510 for a dialogue model according to one or more embodiments described herein. It should be appreciated that the examples shown in diagram 900 are for purposes of illustration only and that other types of representations could also be used. Diagram 900 provides two examples of dialogues 902, 904 that can be presented by the feature constructor component 510 based on input features and output features provided by a dialogue model 20. In both dialogues 902, 904 shown in diagram 900, visual representations can correspond to respective pairwise feature interactions by providing visual emphasis of the first and second features associated with a pairwise feature interaction. In the example shown in diagram 900, this visual emphasis is provided via a box drawn around the features. However, other forms of emphasis, such as text coloration or size, underlining or bolding, etc., could also be used. The visual representations as shown in diagram 900 can further include an annotation of the interaction between the two features of the pair. The example shown in diagram 900 represents this interaction as an arrow; however, any other visual indicator suitable to illustrate an interaction between features could also be used. In an aspect, the visual representations generated by the feature constructor component 510 as shown by diagram 900 can be based on any suitable relationship between features, e.g., one or more types of significance as illustrated by FIGS. 7-8, negation of a first feature by a second feature, anaphora exhibited by a first feature and a second feature, and/or any other suitable relationship.

As shown by diagram 900, the feature constructor component 510 can utilize feature importance to explain an agent response via visual representations and enable an end user to provide feedback for diagnosis. For instance, the feature constructor component 510 can be integrated with the dialogue display to enable a user to provide feedback to the feature constructor component 510 directly through the chat interface provided in the display, e.g., through hashtags indicating an incorrect interpretation as in dialogue 902 and/or an incorrect reply as in dialogue 904. Also or alternatively, the user could provide feedback to the feature constructor component 510 by interacting with the visual representations themselves, e.g., by a clicking an arrow connecting two features to remove an incorrect interaction, to click a word or phrase to indicate importance of that word or phrase, etc. In general, a user can provide feedback for diagnosis relating to correct cues, incorrect cues, biased cues, and/or other aspects of the agent response.

Figure 10:
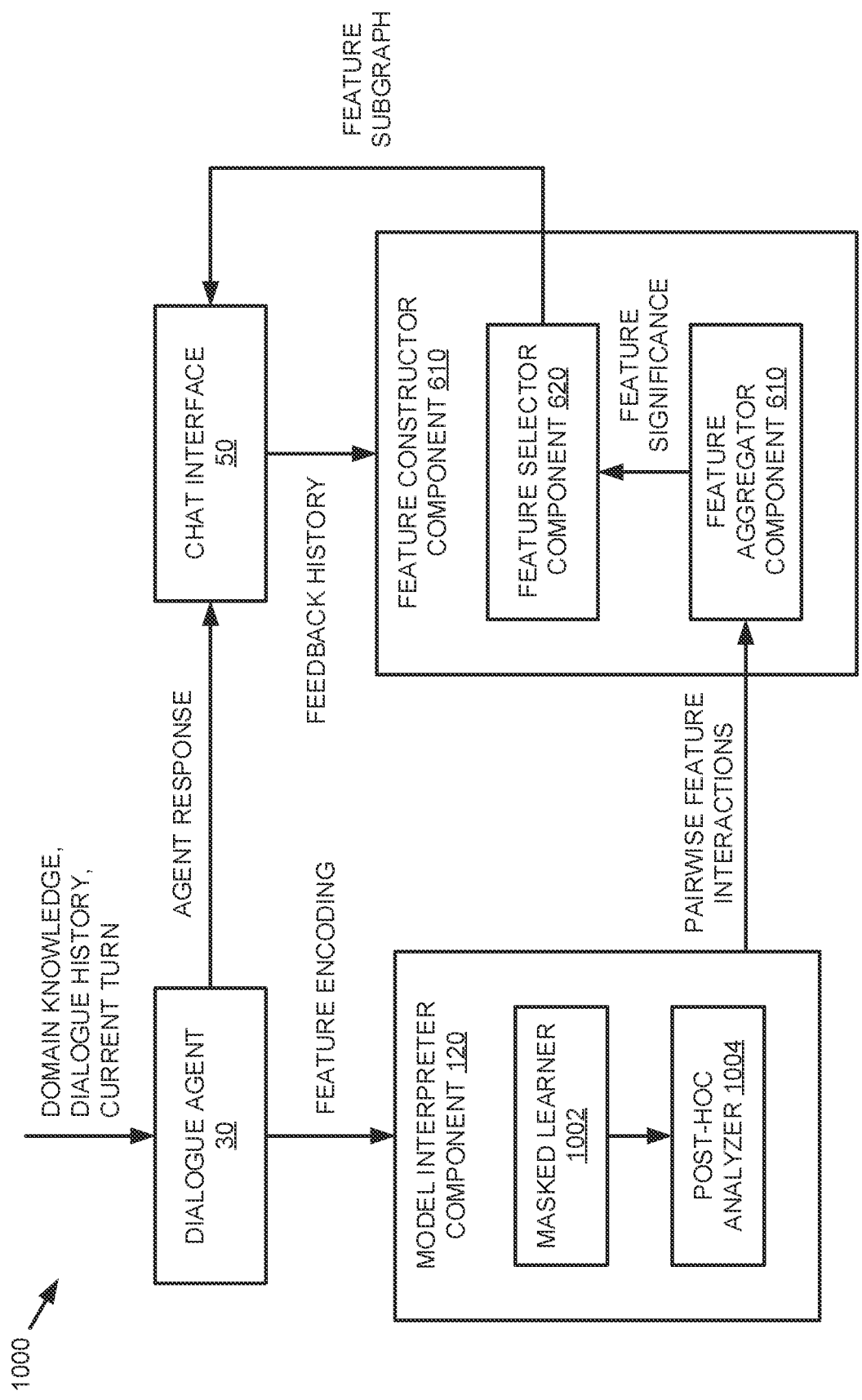
FIG. 10 is a diagram depicting model interpretation and feature construction operations that can be performed for a dialogue agent according to one or more embodiments described herein.

Referring now to FIG. 10, a diagram 1000 depicting model interpretation and feature construction operations that can be performed for a dialogue agent according to one or more embodiments described herein is presented. Repetitive description of like elements employed in other embodiments described herein is omitted for brevity. The system environment shown in diagram 1000 can operate with respect to a dialogue agent 30, which can accept as inputs domain knowledge, a dialogue history, a current turn, and/or other suitable information and provide responses to a chat interface 50 as generally described above. The model interpreter component 120 can receive feature encodings from the dialogue agent 30 (e.g., as extracted by the feature extraction component 110) and process those feature encodings, e.g., in the manner described above with respect to FIG. 4, to determine pairwise feature interactions. For instance, a masked learner 1002 can compute pairwise interaction scores for respective pairs of the encoded features, and a post-hoc analyzer 1004 can process those scores to identify relevant interactions.

The feature interactions determined by the model interpreter component 120 can be passed to the feature constructor component 510, which can operate via the feature aggregator component 610 and feature selector component 620 to generate visual representations as described above with respect to FIG. 6. These representations can take the form of a feature subgraph, which can be overlaid and/or otherwise displayed in combination with the agent responses on the chat interface 50. The chat interface 50 can then be utilized to solicit user feedback regarding the agent responses and/or the representations provided by the feature constructor component 510, which can be provided back to the feature constructor component 510.

Figure 11:
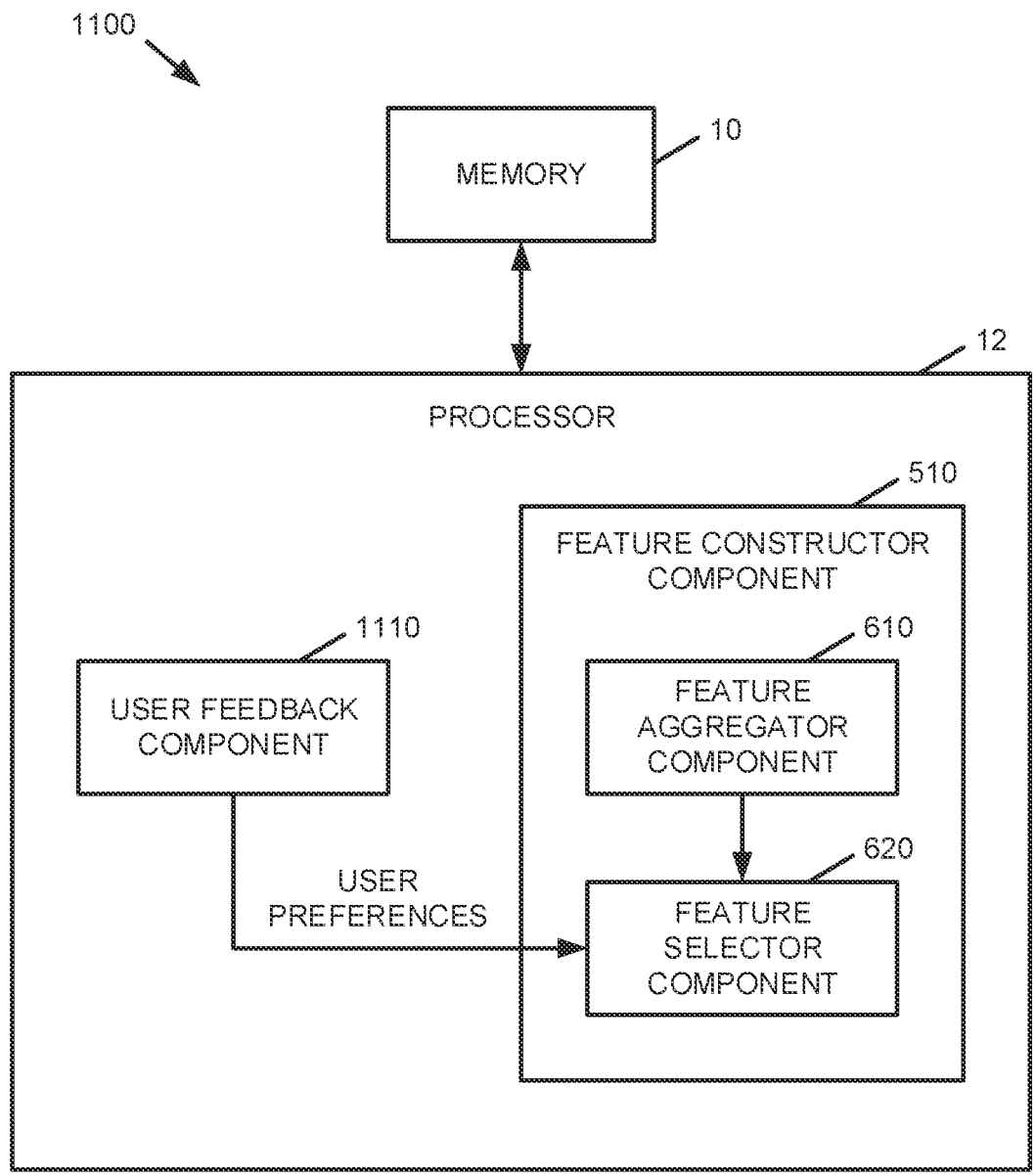
FIG. 11 is a block diagram of a system that facilitates adjustment of displayed content associated with interpretation of a deep neural model based dialogue agent according to user feedback according to one or more embodiments described herein.

A block diagram of a system 1100 that facilitates adjustment of displayed content associated with interpretation of a deep neural model based dialogue agent according to user feedback is illustrated by FIG. 11. Repetitive description of like elements employed in other embodiments described herein is omitted for brevity. System 1100 includes a user feedback component 1110 that can be utilized to solicit and collect user feedback pertaining to various aspects of a dialogue model 20. In addition to soliciting user feedback regarding the accuracy or relevance of agent responses and/or visual indicators as described above, the user feedback component 1110 can further receive user preferences corresponding to visual representations provided by the feature constructor component 510. The feature constructor component 510 can, in turn, adjust selected features and/or their representations according to the feedback.

In various aspects, the user feedback component 1110 can tailor visual representations of respective feature interactions according to various properties. For instance, the user feedback component 1110 can steer operation of the feature constructor component 510 toward representation of specific classes of features according to user feedback, such as functional words or content words. Further, the user feedback component 1110 can enable a user to set a preference for respective types of dialogue significance, such as the types described above with respect to FIGS. 7-8. In another example, the user feedback component 1110 can enable varying levels of detail or information to be displayed with visual representations, e.g., depending on a type of user. For instance, an end user can be presented with a first level of detail, and a data scientist or other high-level user can be presented with a second, finer level of detail. Other types of feedback could also be gathered and/or used.

Figure 12:
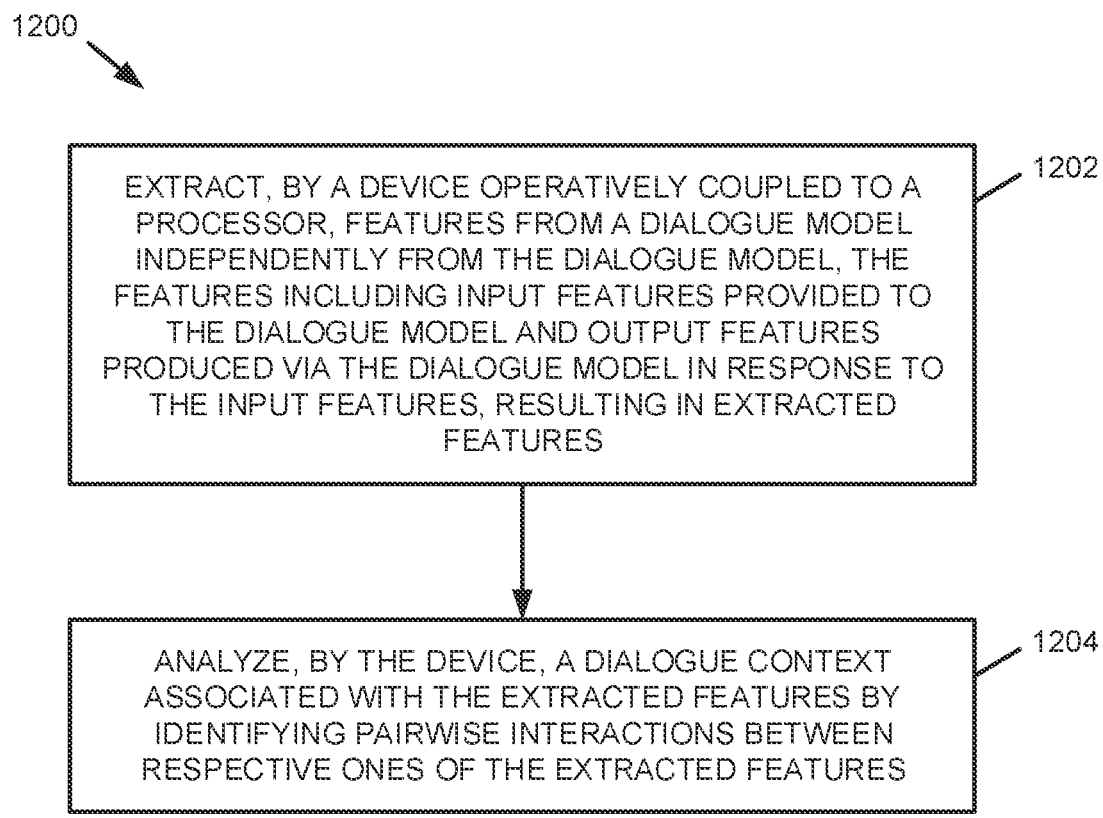
FIGS. 12-13 are flow diagrams of respective example, non-limiting computer-implemented methods that facilitate interpretation of deep neural model based dialogue agents according to one or more embodiments described herein.

FIG. 12 illustrates a flow diagram of an example, non-limiting computer-implemented method 1200 that facilitates interpretation of deep neural model based dialogue agents according to one or more embodiments described herein. Repetitive description of like elements employed in other embodiments described herein is omitted for brevity.

At 1202, a device operatively coupled to a processor (e.g., processor 12) can extract (e.g., by a feature extraction component 110) features from a dialogue model (e.g., a dialogue model 20) independently from the dialogue model. The features extracted at 1202 can include input features provided to the dialogue model and output features produced via the dialogue model in response to the input features.

At 1204, the device can analyze (e.g., by a model interpreter component 120) a dialogue context associated with the features extracted at 1202 by identifying pairwise interactions between respective ones of the extracted features.

Figure 13:
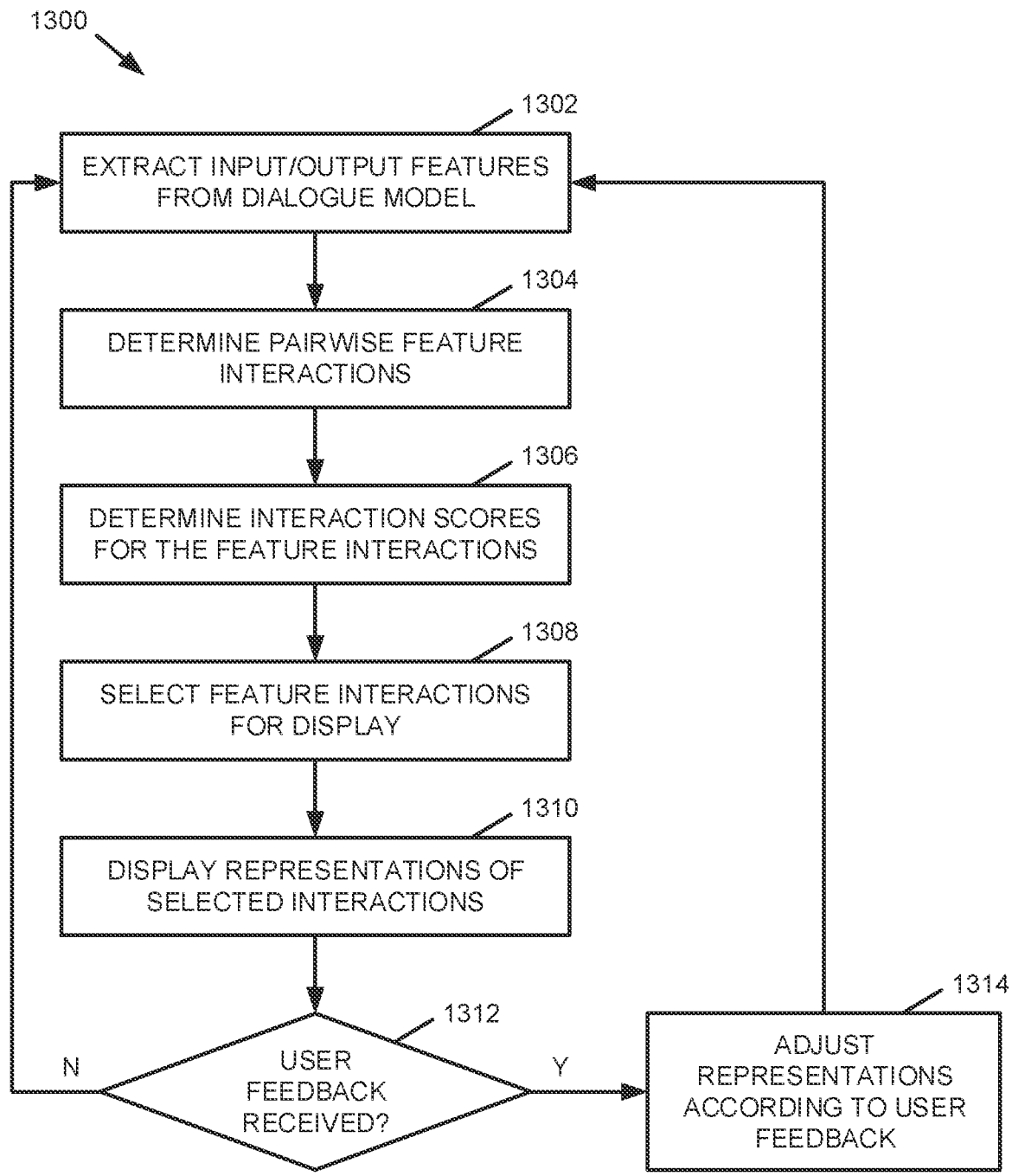

FIG. 13 illustrates a flow diagram of another example, non-limiting computer-implemented method 1300 that facilitates interpretation of deep neural model based dialogue agents according to one or more embodiments described herein. Repetitive description of like elements employed in other embodiments described herein is omitted for brevity.

At 1302, a device operatively coupled to a processor (e.g., processor 12) can extract (e.g., by a feature extraction component 110) input and output features from a dialogue model (e.g., a dialogue model 20).

At 1304, the device can determine (e.g., by a model interpreter component 120) pairwise feature interactions from the features extracted at 1302. Further, at 1306, the device can determine (e.g., further by the model interpreter component 120) feature interaction scores corresponding to the feature interactions determined at 1304.

At 1308, the device can (e.g., by a feature constructor component 510 and/or a feature selector component 620) select feature interactions from among those determined at 1304 for display (e.g., on a chat interface 50 associated with a display device 40), e.g., based on the feature interaction scores determined at 1306. At 1310, representations of the selected interactions can be displayed (e.g., by the feature constructor component 510).

At 1312, the device can prompt (e.g., by a user feedback component 1110) a user for feedback regarding the representations displayed at 1310. If feedback is received at 1312, the device can adjust (e.g., via the feature constructor component 510) the representations according to the received user feedback as shown at 1314. Subsequently, or in response to no feedback being received at 1312, method 1300 can return to 1302 for further processing.

For simplicity of explanation, the computer-implemented methodologies provided herein are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies can alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because configuration of data packet(s) and/or communication between processing components is established from a combination of electrical and mechanical components and circuitry, a human is unable to replicate or perform the subject data packet configuration and/or the subject communication between processing components. For example, a human is unable to generate data for transmission over a wired network and/or a wireless network between processing components, etc. Moreover, a human is unable to packetize data that can include a sequence of bits corresponding to information generated during one or more processes as described above, transmit data that can include a sequence of bits corresponding to information generated during one or more processes as described above, etc.

Figure 14:
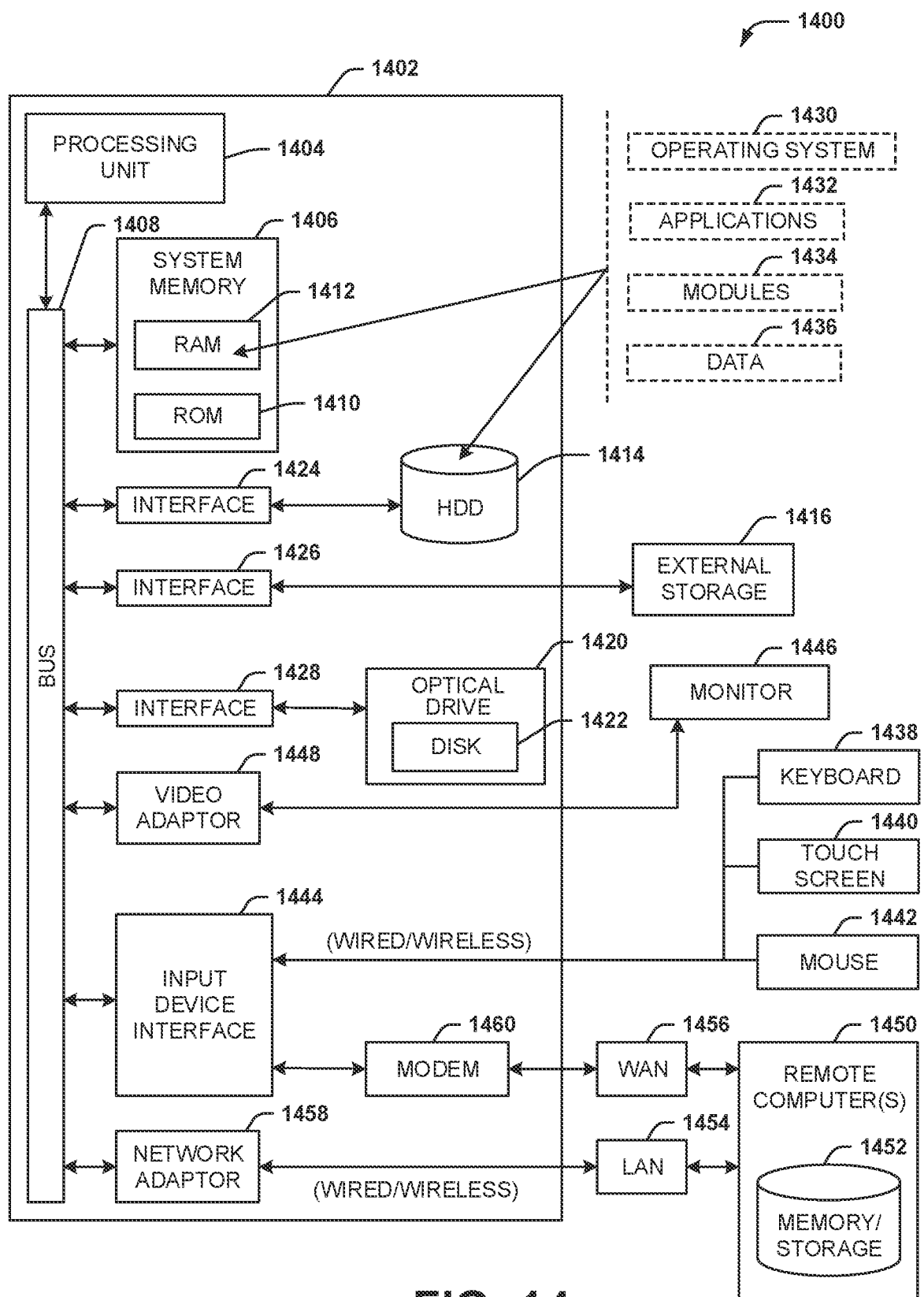
FIG. 14 is a block diagram of an example, non-limiting operating environment in which one or more embodiments described herein can be implemented.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1494 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Various embodiments of the present can be a system, a method, an apparatus and/or a computer program product at any possible technical detail level of integration. The computer program product can include a computer readable storage medium (or media) having computer readable program instructions thereon for causing a processor to carry out one or more aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform one or more aspects of the present invention.

One or more aspects of the present invention are described herein with reference to flowchart illustrations and/or block diagrams of methods, apparatus (systems), and computer program products according to one or more embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While portions of the subject matter have been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Various modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
  a memory that stores computer executable components; and
  a processor that executes computer executable components stored in the memory, wherein the computer executable components comprise:
    a feature extraction component that extracts features from a dialogue model without direct access to operating parameters of the dialogue model and wherein results of the dialogue model are interpreted in a model-agnostic manner enabling processing of the dialogue model for which inner workings of the dialogue model are shielded from access by the feature extraction component; and
    a model interpreter component that analyzes a dialogue context associated with the features extracted by the feature extraction component by identifying pairwise interactions between respective ones of the features, wherein the features comprise input features and output features, wherein the input features are provided to the dialogue model and wherein the output features are produced via the dialogue model.

2. The system of claim 1, wherein the computer executable components further comprise:
  a feature constructor component that generates visual representations of the pairwise interactions between selected ones of the features and facilitates respectively rendering the visual representations on a display device, resulting in improved accuracy of automation tasks performed on a computing system via the dialogue model.

3. The system of claim 2, wherein the computer executable components further comprise:
  a feature aggregator component that computes interaction scores for respective ones of the pairwise interactions identified by the model interpreter component based on a feature significance criterion; and
  a feature selector component that selects the selected ones of the features based on the interaction scores computed by the feature aggregator component.

4. The system of claim 3, wherein the feature significance criterion comprises a criterion selected from a group consisting of role significance, dialogue turn significance, dialogue token significance, and token pair relationship significance.

5. The system of claim 3, wherein the pairwise interactions comprise an interaction between a first feature and a second feature of the features as selected from a group comprising a negation of the first feature by the second feature and anaphora exhibited by the first feature and the second feature.

6. The system of claim 5, wherein the visual representations generated by the feature constructor component comprise visual emphasis of the first feature and the second feature and an annotation of the interaction between the first feature and the second feature.

7. The system of claim 3, wherein the computer executable components further comprise:
  a user feedback component that receives user preferences corresponding to the visual representations, wherein the feature selector component selects the selected ones of the features further based on the user preferences.

8. The system of claim 2, wherein the feature constructor component facilitates respectively rendering the visual representations as an overlay to displayed output features rendered via the dialogue model.

9. A computer-implemented method comprising:
  extracting, by a device operatively coupled to a processor, features from a dialogue model without direct access to operating parameters of the dialogue model, resulting in extracted features; and
  analyzing, by the device, a dialogue context associated with the extracted features by identifying pairwise interactions between respective ones of the extracted features, wherein the features comprise input features and output features, wherein the input features are provided to the dialogue model and wherein the output features are produced via the dialogue model.

10. The computer-implemented method of claim 9, further comprising:
  generating, by the device, visual representations of the pairwise interactions between selected features of the extracted features; and
  facilitating, by the device, respectively rendering the visual representations on a display device, resulting in improved accuracy of automation tasks performed on a computing system via the dialogue model.

11. The computer-implemented method of claim 10, further comprising:
  computing, by the device, interaction scores for respective ones of the pairwise interactions between the respective ones of the extracted features based on a feature significance criterion; and
  selecting, by the device, the selected features of the extracted features based on the interaction scores.

12. The computer-implemented method of claim 11, wherein the feature significance criterion comprises a criterion selected from a group consisting of role significance, dialogue turn significance, dialogue token significance, and token pair relationship significance.

13. The computer-implemented method of claim 11, wherein the pairwise interactions between the respective ones of the extracted features comprise an interaction between a first feature and a second feature of the extracted features as selected from a group comprising a negation of the first feature by the second feature and anaphora exhibited by the first feature and the second feature.

14. The computer-implemented method of claim 11, further comprising:
  receiving, by the device, user preferences corresponding to the visual representations; and
  selecting, by the device, the selected features further based on the user preferences.

15. A computer program product for interpreting a deep neural model-based dialogue agent, the computer program product comprising a non-transitory computer readable storage medium having program instructions embodied therewith, the program instructions executable by a processor to cause the processor to:
  extract features from a dialogue model without direct access to operating parameters of the dialogue model, resulting in extracted features; and
  analyze a dialogue context associated with the extracted features by identifying pairwise interactions between respective ones of the extracted features, wherein the features comprise input features and output features, wherein the input features are provided to the dialogue model and wherein the output features are produced via the dialogue model.

16. The computer program product of claim 15, wherein the program instructions further cause the processor to:
- generate visual representations of the pairwise interactions between selected features of the extracted features; and
- facilitate respectively rendering the visual representations on a display device, resulting in improved accuracy of automation tasks performed on a computing system via the dialogue model.

17. The computer program product of claim 16, wherein the program instructions further cause the processor to:
- compute interaction scores for respective ones of the pairwise interactions between the respective ones of the extracted features based on a feature significance criterion; and
- select the selected features of the extracted features based on the interaction scores.

18. The computer program product of claim 17, wherein the feature significance criterion comprises a criterion selected from a group consisting of role significance, dialogue turn significance, dialogue token significance, and token pair relationship significance.

19. The computer program product of claim 17, wherein the pairwise interactions between the respective ones of the extracted features comprise an interaction between a first feature and a second feature of the extracted features as selected from a group comprising a negation of the first feature by the second feature and anaphora exhibited by the first feature and the second feature.

20. The computer program product of claim 17, wherein the program instructions further cause the processor to:
- receive user preferences corresponding to the visual representations; and
- select the selected features further based on the user preferences.

* * * * *